United States Patent [19]

Guigan

[11] 4,323,169
[45] Apr. 6, 1982

[54] DISPENSER FOR DISPENSING FROZEN GOODS

[76] Inventor: Jean Guigan, 9, rue Jean Mermoz, 75008 Paris, France

[21] Appl. No.: 114,218

[22] Filed: Jan. 22, 1980

[30] Foreign Application Priority Data

Jan. 29, 1979 [FR] France .................................. 79 02199

[51] Int. Cl.³ .............................................. B65G 59/06
[52] U.S. Cl. ....................................... 221/124; 62/353; 221/150 R; 221/290; 221/298; 414/126; 414/131
[58] Field of Search ............... 414/112, 113, 115, 125, 414/126, 127, 128, 131, 330; 221/150 R, 150 HC, 290, 292, 293, 298, 124; 62/353, 378; 294/63 A, 93, 99 R; 92/40, 94, 132

[56] References Cited

U.S. PATENT DOCUMENTS

| | | | |
|---|---|---|---|
| 1,928,368 | 9/1933 | Coffey | 92/132 X |
| 2,071,986 | 2/1937 | Quave | 92/40 |
| 2,213,629 | 9/1940 | Fontaine | 294/63 A X |
| 2,631,440 | 3/1953 | Polk | 62/63 |
| 3,241,688 | 3/1966 | Laird et al. | |
| 3,892,437 | 7/1975 | Makinen | 294/93 |
| 4,173,368 | 11/1979 | Haverbusch | 294/93 X |

FOREIGN PATENT DOCUMENTS

| | | | |
|---|---|---|---|
| 2336211 | 2/1975 | Fed. Rep. of Germany | 92/132 |
| 2180591 | 11/1973 | France | |
| 2183746 | 12/1973 | France | |

*Primary Examiner*—Leslie J. Paperner
*Attorney, Agent, or Firm*—Kenyon & Kenyon

[57] ABSTRACT

Frozen goods, e.g. frozen foods, are arranged in a vertical stack of generally rectangular packages, 2, 3, 4, .... The bottom of the bottom package is supported by supports 7. Inflatable members 5, 5A, 6, 6A are provided for grasping the stack and for separating the bottom package from the stack while retaining the remaining packages. Those portions of the supports and the grasping and separating members which come into contact with the packages are inflatable at least to an extent such that inflation thereof breaks any ice that may have formed on these portions, thereby ensuring that the packages do not adhere to these portions during a dispensing operation.

24 Claims, 23 Drawing Figures

DISPENSER FOR DISPENSING FROZEN GOODS

The present invention relates to a dispenser for dispensing frozen goods arranged in a substantially vertical stack of packages, containing, for example, deep-frozen foods.

Food regulations are now very severe in many countries, and it would be of considerable interest to be able to guarantee that a package of deep frozen food has not been subjected to reheating, e.g. to ambient temperature, at any time between initial freezing and final thawing for use. Such a guarantee can be obtained by using recently devised techniques of marking by temperature-sensitive means, e.g. by means of liquid crystals that change colour. Such marking draws attention to any weak link in the distribution chain, and it appears that there is a technical problem at the point of sale to the user.

At present, deep-frozen packaged foods are piled in open-topped containers whose interiors are maintained at some sufficiently low temperature, without any attempt being made to take advantage of modern automated dispenser technology, e.g. using microprocessors, as is currently used for dispensing packaged pharmaceutical products, for example. The major difficulty lies in the fact that deep-frozen packages, when stacked, have a tendency to adhere to one another because of the layer of ice that forms between them. This is particularly true of packages whose outer surfaces are frozen to temperatures as low as −30° C. or −40° C. Thus any dispenser of frozen goods arranged in stacks or packages must include means for separating the packages from each other.

Preferred embodiments of the present invention provide apparatus capable of handling deep-frozen goods in a rational manner at the point of sale to the end user. In particular, by constituting the last link of a reliable and rational distribution chain, the customer's choice can be delivered instantly without endangering any of the temperature requirements inherent to such sales. Such preferred embodiments of the present invention also provide apparatus which is simple and sufficiently reliable to avoid risks due to ice in its environment.

The present invention provides a dispenser for dispensing frozen goods arranged in a substantially vertical stack of packages, the dispenser including stack grasping means and means for separating the bottom package from the stack while the remaining packages are held, those portions of said grasping and separating means which come into contact with the packages being inflatable at least to an extent such that inflation thereof breaks any ice that may have formed on said portions, thereby ensuring that the packages do not adhere to said portions during a dispensing operation.

BRIEF DESCRIPTION OF THE DRAWINGS

Embodiments of the present invention are described by way of example with reference to the accompanying drawings in which.

DETAILED DESCRIPTION

Figure 1:
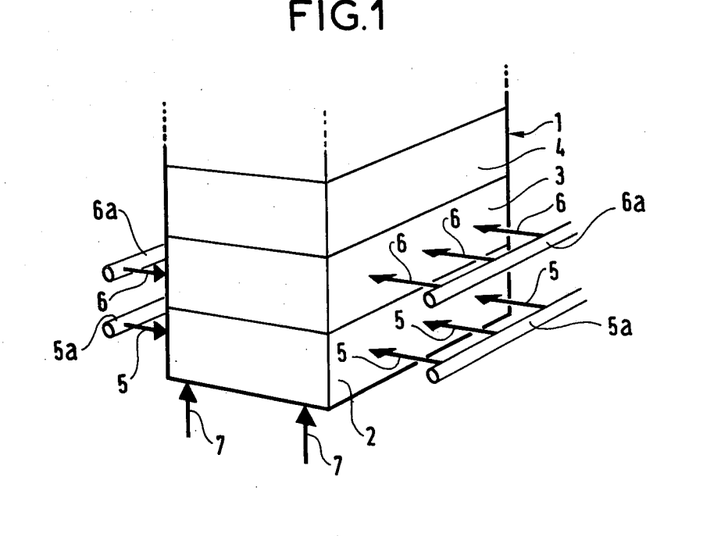
FIG. 1 is a diagrammatic illustration of grasping and separating means associated with a stack of packages of frozen goods in accordance with the invention.

FIG. 1 shows a stack 1 of packages containing deep-frozen foods, disposed in an environment which is permanently maintained at a sufficiently low temperature (may be as low as −40° C.), and associated with a dispenser in accordance with the invention. The dispenser comprises grasping means and means for separating the bottom package 2 from the stack while the remaining packages 3, 4, . . . are held. The said grasping and separating means are designed in such a manner that there is no risk of the means being stuck to the packages by ice. In this figure, the said means are represented by arrows: the grasping means preferably cooperating firstly with pairs of opposite sides of the bottom two packages 2 and 3 of the stack (arrows 5 and 6 respectively), and secondly with the bottom of the bottom package 2 (arrows 7), said contact with the bottom of the bottom package being retractable to allow the bottom package to drop away from the stack in order to be dispensed, as is described in greater detail below. The means for separating the bottom package 2 could be independent of the grasping means, but it is preferable to arrange for the grasping means associated with the bottom package (arrows 5) to be usable as separating means, for example, by applying different contact pressures to the said opposite sides thereof. Thus, by applying pressure symmetrically, the means operate as grasping means, while by applying pressure unequally to opposite sides, the same means operate as separating means by shifting the bottom package by a short distance sideways with respect to the remainder of the stack, thereby guaranteeing that the bottom package no longer adheres to the rest of the stack at any point.

A fundamental feature of the invention lies in the fact that the grasping and separating means are so designed that there is no danger of their sticking to a package in the zones where they come into contact with the packages as represented by the heads of the arrows 5, 6, and 7. This is achieved by arranging for those portions of the grasping and separating means which come into contact with the packages to be inflatable, at least to an extent such that inflation thereof breaks any ice that may have formed on said portions, thereby avoiding the danger of a package sticking to the dispensing means instead of dropping away to be dispensed, and also avoiding the danger of the stack sticking in an upper position after the bottom package has been removed. Means for conveying fluid under pressure 5a and 6a are shown diagrammatically associated respectively with the arrows 5 and 6. Naturally, a layer of material having a low coefficient of friction such as silicone or teflon could also be provided on at least some of the portions which come into contact with the packages.

Figure 2:
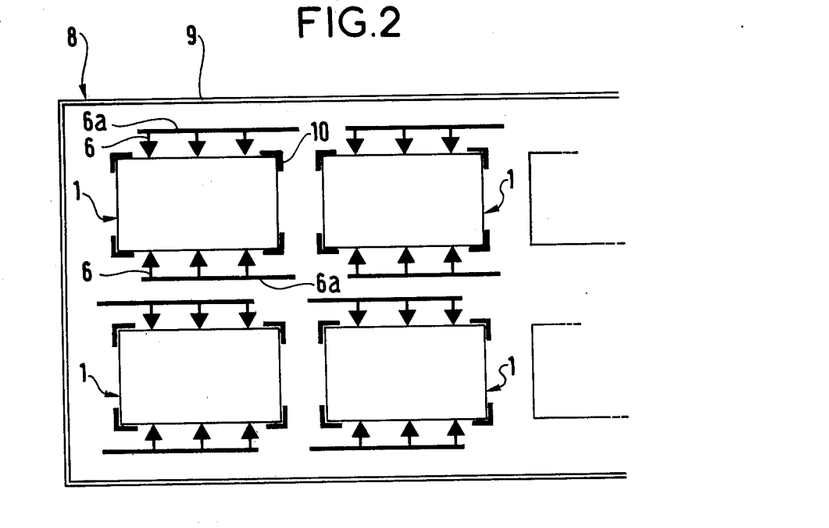
FIG. 2 is a diagrammatic partial plan of a dispenser in accordance with the invention and including a plurality of stacks of packages.

FIG. 1 shows a sub-assembly associated with one stack. FIG. 2 shows a dispenser 8 having a cold chamber 9 which contains a plurality of stacks that are guided and held by angle bars 10, with each stack associated with grasping and separating means. Given the design of such means, the person skilled in the art will have little difficulty in providing the framework necessary for holding the means in place and for receiving the stacks of packages directly from an insulated container, together with control means using conventional automation for dispensing the package at the bottom of a predetermined stack by activating the grasping and separating means associated with the stack. The insulated container in which the stacks are delivered could also be used directly to close the dispenser cold chamber 9.

Clearly, there are many conceivable designs of grasping and separating means suitable for the stacks. For example, the stack could be threaded through a single deformable hollow member (not shown) arranged around the lower part of the stack of packages. This member would combine the function of grasping and separating the packages by a single deformation under the effect of compressed air. The unit would have a deflated "rest" state, in which it supports the bottom of the stack, and an "inflated" state, in which it holds the last but one package while separating the bottom package therefrom, preferably by shifting it far enough sideways for it to fall free from the unit.

Two embodiments, different from the proposal outlined above, are described in detail below; both of these embodiments use independent inflatable members.

Figure 3:
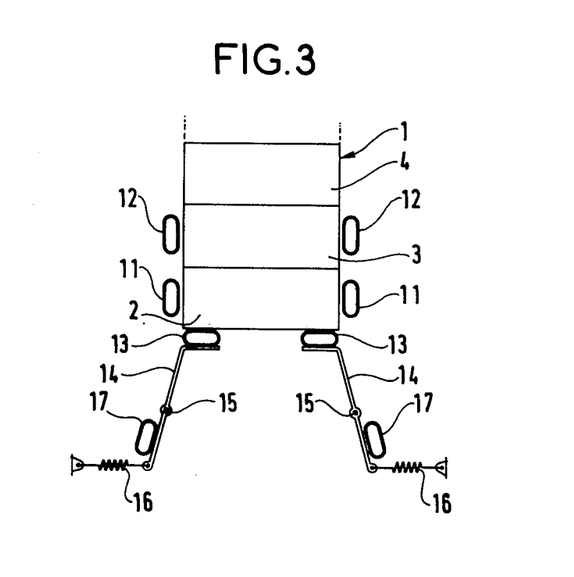
FIG. 3 shows a first embodiment of means for grasping and separating packages, said means including independently inflatable members.

The dispenser shown in FIG. 3 comprises two pairs of inflatable members 11 and 12, arranged on either side of the bottom two packages 2 and 3 respectively. It further includes inflatable members 13 associated with the lower face of the bottom package 2 and mounted on an associated lever 14 arranged to retract the inflatable members 13 for the purpose of dispensing the bottom package. The moving lever 14 is pivoted about an axis 15 and is permanently biassed by resilient means 16 towards its stack-supporting position, with movement towards the retracted position being provided by an inflatable member 17.

Figure 4:
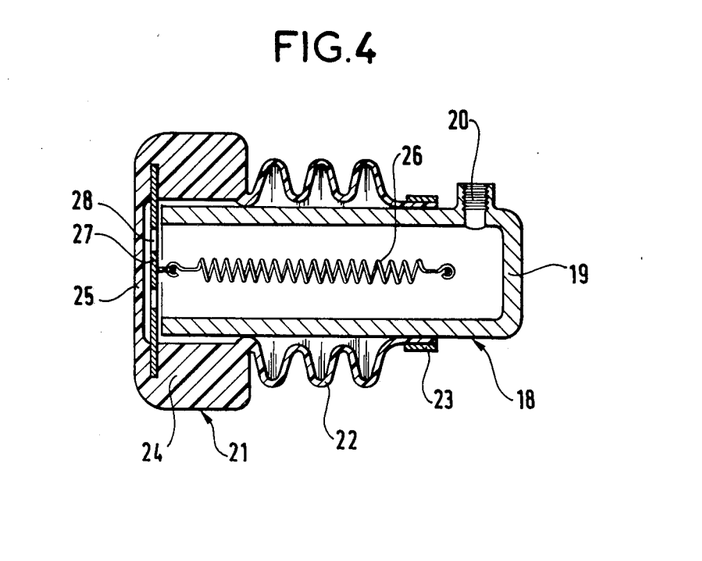
FIG. 4 is an axial section through a variant of an inflatable member suitable for replacing at least some of the inflatable members shown in FIG 3.

The inflatable members 11 and 12 are in the form of cushions having one or more compartments, or alternatively they may be replaced by pistons which would come into contact with a more limited region of the side of the package adjacent thereto. Such a piston 18 is shown in FIG. 4: its fixed part comprises a cylindrical body 19 having an air-inlet 20 (preferably for dehydrated air, e.g. air that has been passed through a silica gel), and its moving part 21 comprises a rear bellows 22 surrounding the body 19 and held in place by ring 23, together with a leading pad 24 connected to the bellows and having an end face 25 which is thin enough to be deformed when the piston is supplied with air under pressure. The pad 24 is connected to the fixed body by resilient return means, such as a spring 26, which is hooked onto a rigid co-axial washer 25 that is imbedded in the pad and which is pierced by openings 28. The moving part 21, preferably made from an elastomer which exhibits little tendency to adhere to ice, is deformed in two ways under the effect of air pressure: the bellows 22 is elongated with the pad moving bodily forwards, and the thin front wall 25 of the pad balloons to more rounded shape.

Figure 5:
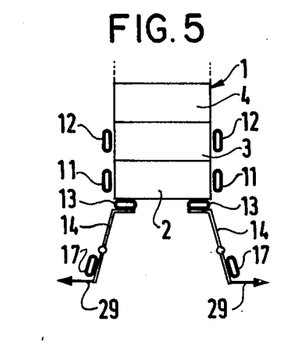
FIGS. 5–12 are diagrams showing the sequence of steps used by the apparatus shown in FIG. 3 to dispense a package (step of FIG. 10), the sequence begins and ends with the apparatus in a rest position.
Figure 6:
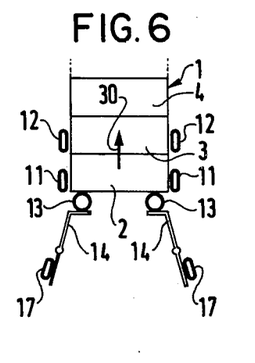
Figure 7:
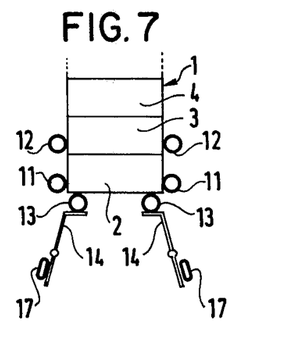
Figure 8:
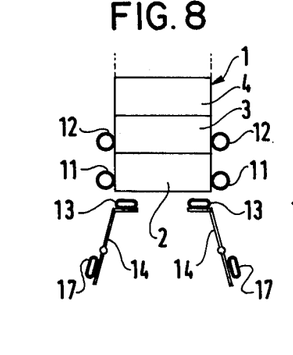
Figure 9:
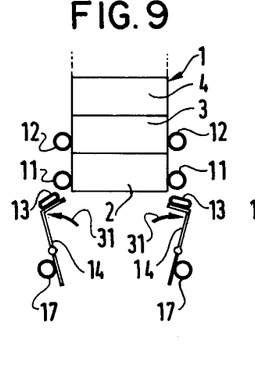
Figure 10:
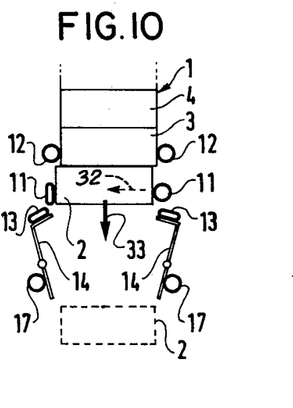
Figure 11:
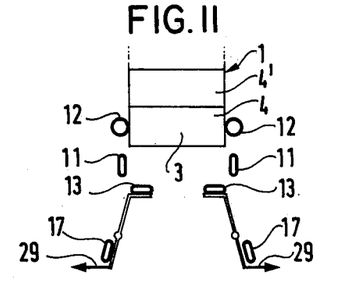
Figure 12:
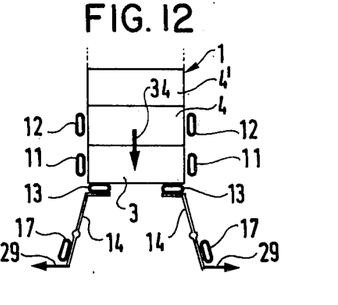

The operation of the dispenser, whether it comprises inflatable cushions or whether it includes pistons such as shown in FIG. 4, is in principle identical, and is described in outline with reference to FIGS. 5 through 12:

(FIG. 5) the inflatable members 11, 12, 13, and 17 are deflated, and the stack of packages is held up by the levers 14 which are held in position solely by their resilient return means (applying a force 29); this is a rest position, and as few components as possible are in an actuated condition;

(FIG. 6) the members 13 are inflated, thereby breaking any ice which may have formed on these members and/or on the bottom of the bottom package 2; this also has the effect of lifting the stack of packages slightly (arrow 30);

(FIG. 7) the members 11 and 12 are inflated, thereby breaking any ice which may have formed thereon;

(FIG. 8) the members 13 are deflated, with the stack being held by the members 11 and 12;

(FIG. 9) the members 17 are inflated; this has the effect firstly of breaking any ice which may have formed on the surface of members 17 and/or against the co-operating portion of the moving lever 14, and secondly of rotating the levers 14 free of the dispensing path (arrows 31);

(FIG. 10) one of the members 11 is deflated, thereby separating the bottom package from the rest of the stack by applying a slight lateral movement thereto (arrow 32); the bottom package then falls under the effect of gravity (arrow 33) towards a lower dispensing outlet (not shown), with the rest of the stack still being held up by the members 12;

(FIG. 11) the still-inflated member 11 is deflated, together with the members 17, thereby bringing the moving levers 14 back to their stack-supporting rest position; and (FIG. 12) finally the members 12 are deflated, allowing the stack to drop (arrow 34) and returning the apparatus to its rest position as illustrated in FIG. 5.

The various successive steps have been shown separately to facilitate understanding. However, in practice, several steps could be performed simultaneously, for example, the steps of FIGS. 8 and 9, thereby providing a dispenser which operates quickly.

Figure 13:
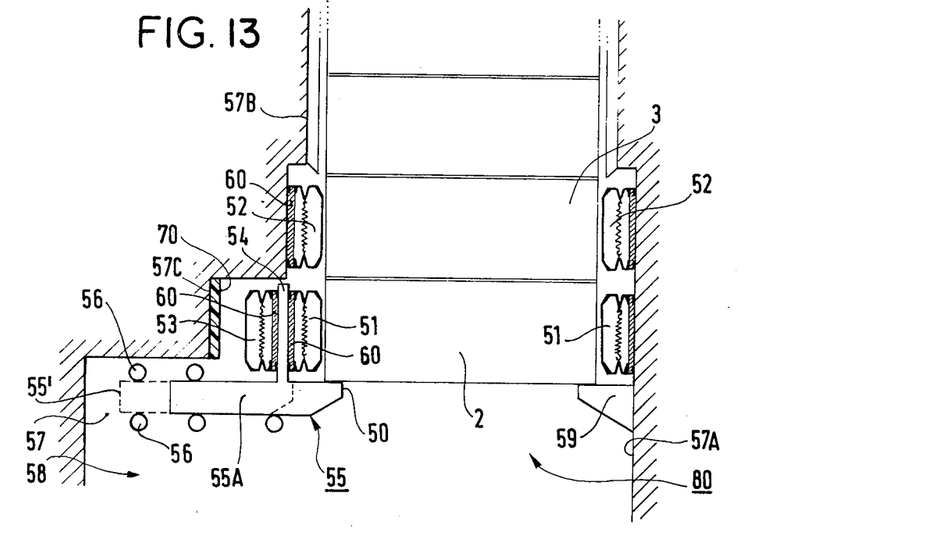
FIG. 13 is a diagrammatic illustration of a second embodiment of means for grasping packages in accordance with the invention and using independently inflatable members.

The second embodiment of a dispenser in accordance with the invention shown in FIG. 13 comprises inflatable members 51 and 52 disposed facing opposite sides of the bottom two packages 2 and 3 respectively of the stack. FIG. 13 also shows inflatable member 53 fixed against a vertical portion 54 carried by a horizontally sliding plate 55 arranged to move freely between guides 56 of cylindrical section. The guides 56 could alternatively be of triangular section, and they are fixed to the sides of the chamber in which the stack of packages is stored; more precisely, they are in a recessed portion 58 thereof.

The sliding plate 55 has two guide arms (not shown) having as small a contact surface as possible with the guides 56; this arrangement is to reduce accumulation of frost on these parts and to ensure low friction for the sliding plate. It should also be observed that when moving, the sliding plate 55 breaks any ice which may have accumulated on the surface of its guide means, and said ice drops freely in the recess 58 beneath the sliding plate 55 when the plate moves to occupy the position illustrated by dashed lines 55'. The plate 55 and its guides are made of materials such as teflon to avoid extensive frosting of their surfaces.

Further, the stack of packages in the chamber 80 delimited by the walls 57 and 57A and 57B is supported by the bottom of the bottom package 2 resting firstly on fixed support fingers 59, likewise made of teflon and fast with the wall 57A, and secondly on projecting tips 50 of the sliding plate 55. It should be observed that support is provided at a few separate points along each side of the package 2, rather than by a continuous shelf; this is to reduce the adhesive power of any frost formation that will need to be broken during dispensing.

Further, the wall 57C of the chamber against which the inflatable member 53 comes into contact when the sliding plate 55 moves into the recess 58, is provided with a deformable covering 70 made of an elastomer material suitable for avoiding the accumulation of ice or frost by causing any such incipient accumulation to fracture when the member 53 comes into contact with the covering 70.

Figure 14:
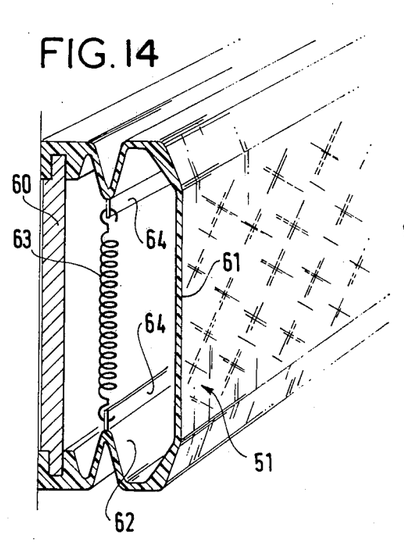
FIGS. 14 and 15 are diagrammatic illustrations of an inflatable member as shown in FIG. 13, respectively in a rest position and in an inflated position.

It can further been seen that one of the inflatable members 51 is fixed on the other face of the vertical portion 54. FIG. 14 shows the structure of an inflatable member 51, 52 or 53, all of which have the same structure. These members comprise a rigid wall 60 on which a bellows-like deformable portion 61 is attached. The deformable portion 61 has a V-shaped indentation running the length of its upper and lower surfaces, with the points of the V's facing each other. These points are biassed towards each other by means of internal springs 63 which are hooked into a reinforcing member 64 running the length of each V. In an alternative embodiment, the springs 63 could be replaced by a resilient membrane (not shown) including openings to allow the compressed air to pass through. The membrane would extend between the reinforcing members 64 and be fast therewith. Referring again to FIG. 13, it can be seen that inflatable members 52 and one of the members 51 are fixed to the walls of the chamber via their rigid walls 60, while the remaining member 51 and the member 53 are fixed to the vertical portion 54 of the sliding plate 55 likewise by means of their rigid walls 60.

Figure 15:
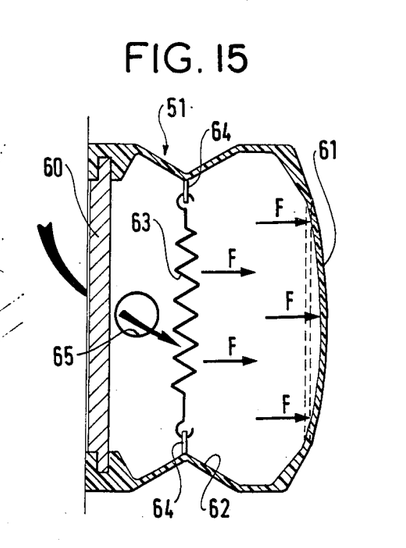

FIG. 15 shows the shape adopted by the inflatable members, e.g. the member 51, when they are supplied with dehydrated compressed air via an air inlet 65. In this position, the pressure exerted by the air in the direction of the arrows F has the effect of stretching both the bellows and the springs 63. The front surface 61 of the inflatable member balloons outwardly to break ice as before, and when the air pressure is released the member returns to the shape shown in FIG. 14.

The operation of the dispenser of FIG. 13 is outlined with reference to FIGS. 16 through 23:

(FIG. 16) the inflatable members 51, 52 and 53 are deflated, and the stack of packages is supported by the tips 50 of the sliding plate 55 and by the fixed support fingers 59, together supporting the bottom face of the bottom package 2; this is the rest position in which all the components are at rest;

(FIG. 17) the members 52 and the member 53 are inflated, thereby breaking any ice formation thereon or on the sides of the package 3 and holding the package 3 in position;

(FIG. 18) the members 51 are partially inflated to break any ice that may have formed thereon or on the sides of the package 2;

(FIG. 19) the members 51 are fully inflated while the member 53 is deflated; this breaks the ice between the bottom two packages 2 since the bottom package is moved sideways, while the sliding plate 55 retracts into its recess 58 (see FIG. 13).

Figure 16:
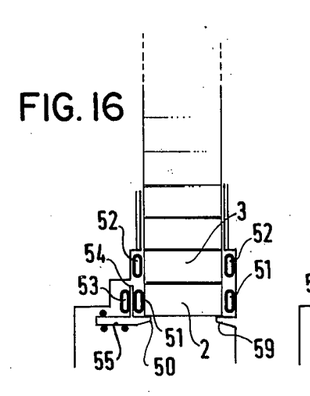
FIGS. 16–23 are diagrams showing the sequence of steps used by the apparatus shown in FIG. 6 to dispense a package (step of FIG. 20), the sequence begins and ends with the apparatus in a rest position.
Figure 17:
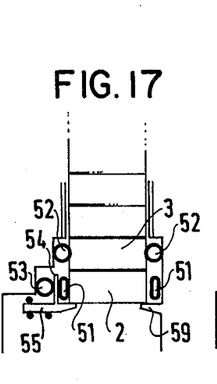
Figure 18:
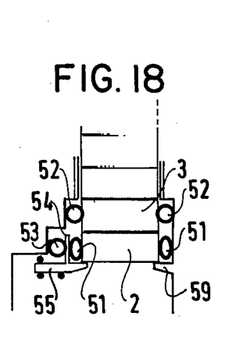
Figure 19:
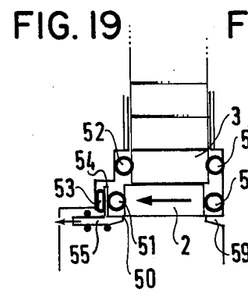
Figure 20:
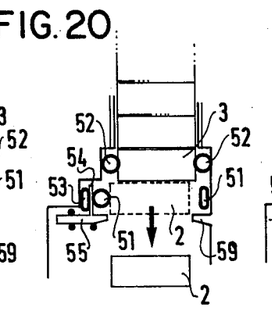
Figure 21:
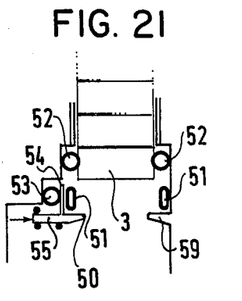
Figure 22:
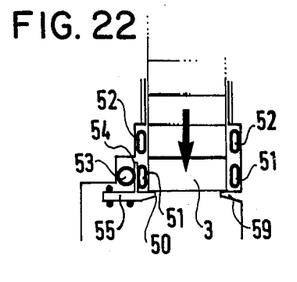
Figure 23:
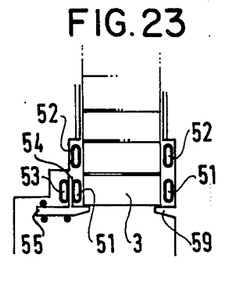

(FIG. 20) the member 51 which is fixed to the wall of the chamber is deflated, allowing the bottom package 2 to fall under the effect of gravity towards a dispensing outlet (not shown), while the rest of the stack is held up by the members 52;

(FIG. 21) the other member 51, i.e. on the sliding plate 55, is then deflated while the member 53 is inflated, thereby returning the sliding plate to its initial position with its tips 50 suitably placed to support the next package;

(FIG. 22) the members 52 are deflated, allowing the stack of packages to drop until supported by the package 3 resting on the tips 50 of the plate 55 and on the fixed support fingers 59;

(FIG. 23) finally the member 53 is deflated, leaving the sliding plate 55 held in position by the weight of the stack and returning the dispenser to its initial position as shown in FIG. 16, with all its components at rest.

The successive steps have been shown separately for ease of understanding, but several of them could naturally take place simultaneously so that the dispenser as a whole has a short operating time.

It will further be observed that, after a package has been dispensed, the hole through which the package was dropped is closed by inflating the member 53 to slide the plate 55 from its open position towards a closed or rest position.

This action could be assisted by a spring or other fail-safe system (not shown).

In a cold chamber 9 (FIG. 2) including a plurality of stacks (the usual configuration) and using elongated inflatable members, many of the elongated inflatable members can extend along an entire row of stacks. Thus, in the embodiment shown in FIGS. 3 and 5 through 12, only the lever-actuating inflatable members 17 need to be operated independently for each stack. The beneficial effect would be to break frost accumulations on all stacks of a row every time any stack of the row dispenses a package. (Clearly if such an arrangement is used there is a need for an additional step, between the steps of FIG. 10 and FIG. 11, in which each un-dispensed bottom package is returned to its normal position at the bottom of its stack). A similar arrangement can be devised for the embodiment shown in FIGS. 6, 7, 8 and 9, and again the inflatable members that actuate the moving part, in this case the sliding plate 55, need to be operated independently for each stack.

I claim:

1. Apparatus for dispensing a package of frozen goods from one end of an aligned plurality of contiguous packages maintained in a below freezing environment, the apparatus including means for releasably grasping a package next adjacent to the package at one end of such an aligned plurality of packages, means for separating said end package from the next adjacent package by applying a force against at least one side of the end package while said grasping means is actuated, means for supporting said grasping means and said separating means to permit selective engagement and disengagement thereof with the corresponding packages, and means for selectively actuating said grasping means and said separating means to engage the corresponding packages, wherein the improvement comprises:

said grasping means and said separating means having resiliently deformable contact surfaces for directly contacting said next adjacent package and said end package, respectively, and means for deforming said contact surfaces convexly toward the respective packages by an amount sufficient, when said grasping means and said separating means are actuated, to break away any ice which may have formed on said surfaces between dispensing operations, whereby the packages will not adhere to said contacting surfaces during a dispensing operation.

2. Dispensing apparatus according to claim 1 wherein the aligned plurality of packages of frozen goods is arranged in a substantially vertical stack, and said end package to be dispensed is the bottom package of the stack.

3. Dispensing apparatus according to claim 2 wherein said grasping means and said separating means comprise a single hollow inflatable member surrounding the lower part of the stack of packages, said member being so shaped as to perform both grasping and separating functions in a single operation when inflated.

4. Dispensing apparatus according to claim 2, further comprising:
means for at least partially supporting the bottom package of the stack in the intervals between dispensing operations, said support means being retractable to permit the bottom package to drop away from the stack upon actuation of the separating means.

5. Dispensing apparatus according to claim 4 wherein the retractable supporting means comprises a horizontal plate slidably mounted for movement between a stack supporting position and a retracted position, the plate having tips which underlie an edge of the bottom package of the stack when the plate is in the stack supporting position.

6. Dispensing apparatus according to claim 4 wherein the grasping means comprises a pair of inflatable members arranged adjacent to opposite sides of the package next above the bottom package of the stack, and the separating means comprises an inflatable member arranged adjacent to one side of the bottom package.

7. Dispensing apparatus according to claim 6 further comprising an additional inflatable member arranged on the opposite side of the stack from the separating means and having a convexly deformable surface for contacting the opposite side of the bottom package, the inflatable member of the separating means and the additional inflatable member cooperating to serve as grasping means for the bottom package.

8. Dispensing apparatus according to claims 4, 6, or 7 wherein the retractable supporting means comprises at least one inflatable member having a contact surface which is resiliently deformable convexly upward to break any ice which may form between said contact surface and the bottom of the bottom package of the stack between dispensing operations.

9. Dispensing apparatus according to claim 8 wherein the retractable supporting means further comprises:
a moving unit upon which said supporting inflatable member is mounted,
resilient means for biasing the moving unit into a stack supporting position, and
fluid actuated means for retracting said moving unit to permit dispensing of the bottom package of the stack.

10. Dispensing apparatus according to claims 6 or 7 wherein at least some of the inflatable members comprise a plurality of pistons, each piston having a moving part with an end wall that is sufficiently thin to be deformed when the piston is supplied with compressed air, the exterior of said end wall serving as said resiliently deformable contact surface.

11. Dispensing apparatus according to claim 10 wherein said moving part of each piston comprises an extensible bellows portion, fixedly mounted at one end, and a forward pad at the other end of said bellows portion, said forward pad including said deformable end wall, and said piston further comprises a resilient return means connected between said forward pad and the fixed end of the bellows portion.

12. Dispensing apparatus according to claim 11 wherein said moving part of each piston further comprises a rigid washer arranged coaxially in the interior of said forward pad parallel to said end wall, the resilient return means being connected to said washer.

13. Dispensing apparatus according to claim 5 wherein each of the inflatable members of said grasping means and said separating means comprises:
a rigid wall;
an extensible bellows means fixed to said rigid wall and having a resiliently deformable end wall spaced from said rigid wall;
means for biasing the bellows means towards its contracted condition; and
means for supplying compressed air to the interior of said bellows means for extending said bellows and for deforming said end wall convexly outward into direct contact with an adjacent surface of the corresponding package in the stack of packages.

14. Dispensing apparatus according to claim 13 wherein the means for supporting the grasping means and the separating means comprises a chamber having rigid walls, and the rigid wall of each inflatable member of the grasping means and said inflatable member of the separating means is fixed to a corresponding one of the rigid walls of the chamber.

15. Dispensing apparatus according to claim 13 wherein said retractable supporting means comprises:
a supporting member mounted for substantially horizontal translation between a stack supporting position and a retracted position in a recess of a rigid wall of the chamber, the supporting member including a vertical portion,
and
at least one pair of additional inflatable members each member having a rigid plate and an extensible bellows means fixed to said plate, the rigid plate of one member of said pair being fixed to one side of the vertical portion and the rigid plate of the other member of said pair being fixed to the other side of the vertical portion.

16. Dispensing apparatus according to claim 15 wherein the supporting member includes tips which underlie one edge of the bottom package of a stack of packages when the member is in the stack supporting position, and the apparatus further comprises a fixed supporting member attached to the rigid wall of the chamber opposite the retractable supporting means and having fingers which underlie an edge of said bottom package opposite said one edge, the movement of said retractable supporting member to the retracted position freeing a passage through which the bottom package may drop.

17. Dispensing apparatus according to claim 15, further comprising guides arranged in the recess of said chamber wall, and said retractable supporting member includes two guide arms arranged to slide between said guides.

18. Dispensing apparatus according to claim 15, wherein said retractable supporting member comprises a plate, and said tips comprise a plurality of spaced apart members extending from one edge of the plate in the form of a fork structure.

19. Dispensing apparatus according to claim 15, further comprising a deformable elastomer material covering a wall of the recess contacted by the other of said pair of additional inflatable members, whereby ice formed on said elastomer material between dispensing operations will break away when the separating means is actuated.

20. Dispensing apparatus according to claim 13 wherein each extensible bellows means has a mid-portion with two opposed inwardly-directed folds, and said biasing means comprises a tension spring connected between said folds.

21. Dispensing apparatus according to claim 13 wherein each extensible bellows means has a mid-portion with two opposed inwardly directed folds, and said biasing means comprises an extensible membrane interposed in the bellows between said folds, the membrane having openings therethrough.

22. Dispensing apparatus according to claim 6 wherein at least some of the inflatable members of said grasping means and said separating means comprise elongated inflatable cushions which extend over a plurality of stacks of packages.

23. Dispensing apparatus according to claim 1, said apparatus accommodating a plurality of stacks of packages and further comprising control means for selecting the stack from which a package is to be dispensed.

24. Dispensing apparatus according to claim 1, wherein said means for supporting the grasping and separating means comprises a rigid framework, and said apparatus further comprises an insulated chamber positioned above the rigid framework for delivering a stack of packages directly thereto and for serving as a closure member to maintain the below freezing environment of said apparatus.

* * * * *

UNITED STATES PATENT AND TRADEMARK OFFICE
CERTIFICATE OF CORRECTION

PATENT NO. : 4,323,169
DATED : 6 April 1982
INVENTOR(S) : Jean GUIGAN

It is certified that error appears in the above—identified patent and that said Letters Patent is hereby corrected as shown below:

Column 5, line 4: after "guides" insert --56--.

Column 8, line 24: change "5" to --6--.

Signed and Sealed this

Third Day of August 1982

[SEAL]

Attest:

GERALD J. MOSSINGHOFF

Attesting Officer

Commissioner of Patents and Trademarks